(No Model.)
W. E. DAVIS.
YIELDING CONNECTION FOR PULLEYS.
No. 407,997. Patented July 30, 1889.
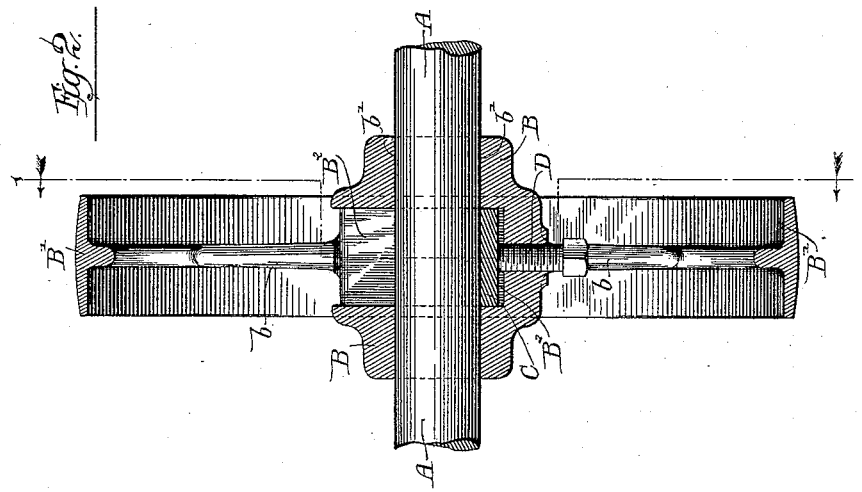
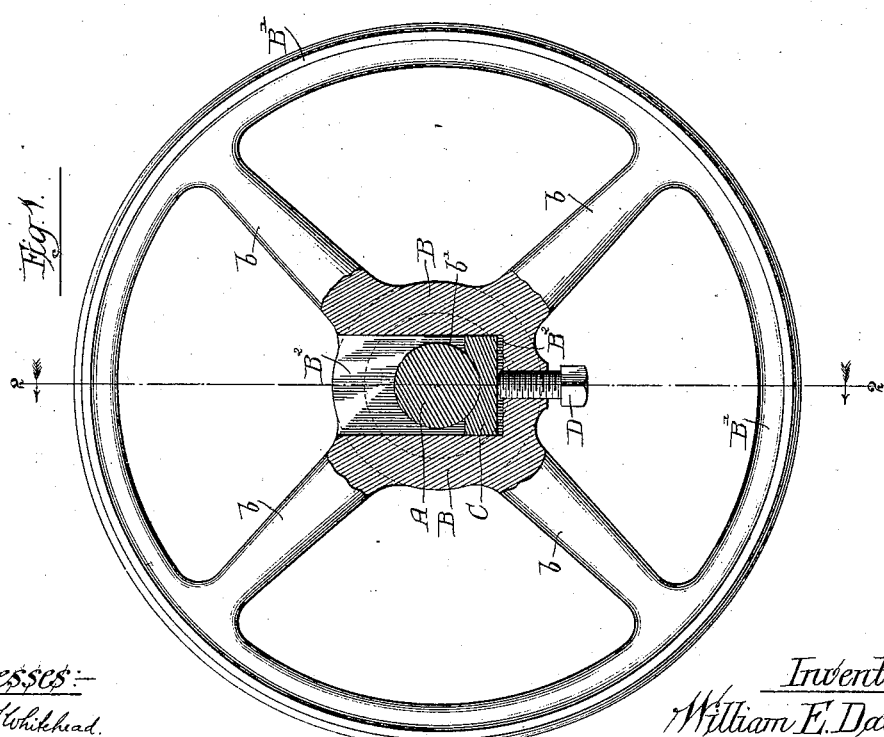
Witnesses:
Louis M. Whitehead.
Wm. F. Henning.
Inventor:
William E. Davis.
by Dayton, Poole & Brown
Attorneys.
N. PETERS, Photo-Lithographer, Washington, D. C.

UNITED STATES PATENT OFFICE.

WILLIAM E. DAVIS, OF RACINE, WISCONSIN.

YIELDING CONNECTION FOR PULLEYS.

SPECIFICATION forming part of Letters Patent No. 407,997, dated July 30, 1889.

Application filed April 4, 1889. Serial No. 305,944. (No model.)

*To all whom it may concern:*

Be it known that I, WILLIAM E. DAVIS, of Racine, in the county of Racine and State of Wisconsin, have invented certain new and useful Improvements in Yielding Connections for Pulleys; and I do hereby declare that the following is a full, clear, and exact description thereof, reference being had to the accompanying drawings, and to the letters of reference marked thereon, which form a part of this specification.

This invention relates to a novel construction in devices for attaching fly-wheels or belt-pulleys to driving or other shafts in such manner as to afford a yielding connection between the wheel or pulley and shaft, allowing the wheel or pulley to turn upon the shaft in case the strain coming upon the parts driven by the shaft exceeds the strength of any of the working parts of the machine or the shaft or pulley, thereby preventing breakage or injury to any of the parts under such circumstances.

The invention is more especially intended for connecting the belt-pulley of a straw-cutter with the main drive-shaft thereof, so that in case the cutters of such machine come in contact with a hard object—such as a stone or iron bolt—the belt-pulley may turn upon the shaft, thus allowing the stoppage of the machine without injury to the cutter or other parts.

The invention consists in the matters hereinafter described, and pointed out in the appended claims.

In the accompanying drawings illustrating my invention, Figure 1 is a side elevation of a belt-pulley, with the hub and supporting-shaft thereof in section taken upon line 1 1 of Fig. 2. Fig. 2 is a transverse section through the pulley and shaft, taken upon line 2 2 of Fig. 1.

As illustrated in said drawings, A is the shaft, B the hub, B' the rim, and *b b* the spokes, of a belt-pulley, which is mounted upon said shaft. The pulley-hub B is provided with the usual cylindric aperture *b'*, within which the shaft is inserted and closely fits. Within said hub B is formed a radially-arranged cavity or recess $B^2$, which extends inwardly from one side of the hub to a point past the shaft-aperture *b'*. Within said recess, between the inner end thereof and the shaft A, is inserted a metal block or gib C, which is provided with a concave surface in contact with the said shaft.

D is a set-screw inserted through the hub and bearing upon the outer face of the block C in such manner that when the set-screw is turned inwardly the follower C will be carried into forcible contact with the shaft A.

In the use of the attaching device described the gib C is tightened against the shaft with sufficient force to hold the pulley rigid with the shaft in the usual operation of the machine, while allowing the pulley to turn upon the shaft in case any undue strain is brought upon the pulley-shaft or parts driven by the latter. I am aware that it has been proposed heretofore to use for a similar purpose a device consisting of gibs inserted in recesses formed within the wheel-hub and pressed against the shaft by set-screws. Such recesses, however, have heretofore been so formed that the gibs can only be inserted through the central shaft-opening of the hub. My improvement therefore consists, essentially, in extending the gib-recess through the hub from the side of the hub opposite that at which the set-screw is located, so that the gib may be easily inserted in place. This construction furthermore affords the desired yielding connection between the shaft and pulley, while at the same time preserving a simple, strong, and durable construction in the parts.

I claim as my invention—

The combination, with a shaft and wheel or pulley, of a hub surrounding the shaft and provided with a recess extending inwardly from one side of the hub to a point past the shaft-aperture, a gib inserted in said recess and bearing against the shaft, and a set-screw inserted through the side of the hub into the inner end of said recess and bearing against said gib, substantially as described.

In testimony that I claim the foregoing as my invention I affix my signature in presence of two witnesses.

WM. E. DAVIS.

Witnesses:
 GEO. R. WEST, Jr.,
 F. W. WOOD.